Dec. 3, 1968  D. M. HOMS  3,413,952
SCALE WITH ADJUSTABLE COVER-DIAL COMBINATION
Filed Oct. 12, 1966

INVENTOR.
DOUGLAS M. HOMS
BY
ATTORNEY

3,413,952
SCALE WITH ADJUSTABLE COVER-DIAL
COMBINATION
Douglas M. Homs, Hillsborough, Calif. (% Douglas
Home Co. Inc., 1640 Rollins Road, Burlingame, Calif.
94010)
Filed Oct. 12, 1966, Ser. No. 586,080
3 Claims. (Cl. 116—114)

ABSTRACT OF THE DISCLOSURE

A removable, transparent, circular cover for a dial scale is provided with markings to be read in conjunction with a conventional scale pointer. The cover may be interchanged with another with different markings. The cover is frictionally attached to the scale body so that it can be twisted to set the "zero" marking or to compensate for tare, or in batch weighing.

---

This invention relates to a new and improved scale with adjustable cover-dial combination. More particularly, the present invention relates to a dial type scale having a pointer with weight markings and other information applied either to the inside or outside surface of a circular transparent cover so that the scale's pointer may be read in conjunction with the markings on the cover positioned in front of the pointer rather than on the conventional dial which is ordinarily placed in back of the pointer.

A principal feature of the present invention is that fact that the cover can be removed and interchanged for other covers. Dial scales of the general type of this invention are frequently used to weigh mail and parcels wherein the pointer indicates not only the number of ounces of the object being weighed but also the postage required. Inasmuch as postal rates are subject to frequent change, the postage rates shown on conventional scales become obsolete and must be revised from time to time, a problem which detracts from the usefulness of conventional scales. Since the cover of the present invention is relatively inexpensive, the cover may be replaced with a new cover having new postal rate markings whenever there are rate changes.

Further, although scales of this general type are generally used for weighing mail, it is sometimes desirable to use the same scale for a variety of purposes. By interchanging the covers, the same scale mechanism may be used to read directly not only postal rates but other information.

In conventional scales of this type, it is customary to provide a knob, screw or other means for setting the pointer to zero when the scale pan is empty or to provide a tare compensation. The present invention makes zero setting or tare setting mechanisms unnecessary, inasmuch as the dial cover is only frictionally attached to the scale body and can be twisted so that the pointer coincides with the zero markings of the scale.

Still another advantage of the present invention is the fact that the scale may be used conveniently for batch weighing. Thus in certain installations it is necessary to prepare batches in accordance with a formula. The fact that the cover of the scale may be twisted relative to the scale body and that the scale indicator may be set at zero at any desired position on the circumference of the scale body is of particular advantage in this operation. Thus the first ingredient is added to the scale pan until the pointer reaches the weight indication for that particular ingredient. Thereupon the dial is twisted so that the pointer is reset at zero. Thereupon the desired amount of the second ingredient is added to the pan until the pointer reaches the required weight of the second ingredient. The cover can be reset to zero and the third and subsequent ingredients added as required. This feature of the invention makes it unnecessary to compute the combined weight of the several ingredients which are sequentially added and further reduces the opportunity for error by erroneous computation.

A still further advantage of the present invention is the fact that if the weight indications are applied to the cover, the pointer may be constructed so that it is in close proximity to the cover and hence the reading of the scale is more accurate since the distance between the pointer and the scale markings is reduced and the opportunity for erroneous reading by reason of parallax is reduced.

Other objects of the present invention will become apparent upon reading the following specification and referring to the accompanying drawings in which similar characters of reference represent corresponding parts in each of the several views.

Figure 1:
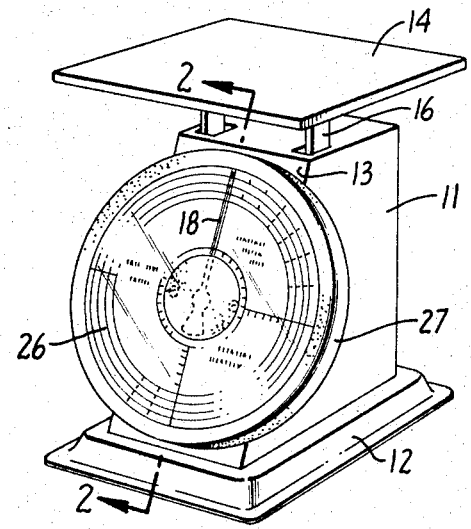
FIG. 1 is a perspective view of a scale in which the present invention is installed.
Figure 3:
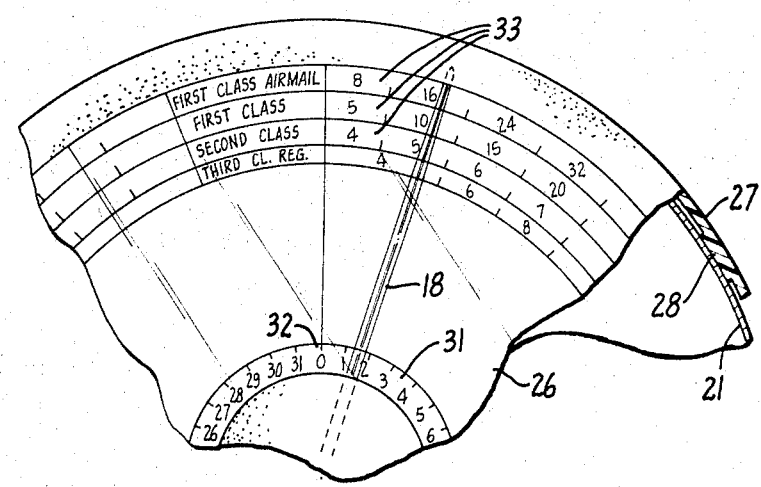
FIG. 3 is a fragmentary plan view partly broken away in section of the cover and a portion of the underlying mechanism.

The present invention is useful on a variety of type of dial scales, of which that illustrated herein is typical. As shown in FIG. 1, there is provided a scale casing 11 mounted on a pedestal 12 and having a slanted front panel 13. Above the casing 11 is a pan or platform 14 supported by legs 16 which extend into the casing 11 and are connected to scale mechanism (not shown) within the casing. The aforesaid mechanism turns a shaft 17 which projects outwardly through front panel 13 and carries on the exterior a pointer 18. The angular movement of the pointer 18 is proportional to the weight of the material applied to the pan 14.

In front of panel 13 and between said panel and pointer 18 is a disk 19 having an outward turned peripheral flange 21, the exterior of flange 21 being smooth and cylindrical. The outward facing surface of disk 19 is white or otherwise coated to improved visibility of the scale reading. The shaft 17 extends through a central aperture in disk 19 so that the pointer 18 is positioned in front of the disk. Common practice is to provide a dial (not shown) behind pointer 18, carrying weight markings and, frequently, postage rates markings are applied directly to such dial. When rates are changed, changing of the markings on the dial is difficult and necessitates applying a new dial under the pointer and over the original dial, or discarding the scale or using a conversion table.

Figure 2:
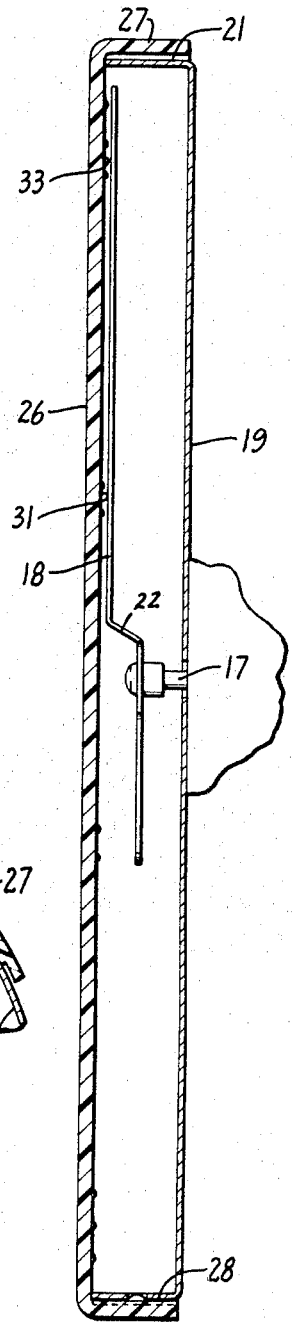
FIG. 2 is an enlarged fragmentary sectional view taken substantially along the line 2—2 of FIG. 1.

It is also common practice to use a cover over the dial to keep the dial clean and also to prevent dust from entering the scale mechanism through apertures in disk 19. Further, the dust cover prevents external interference with the movement of pointer 18. The present invention employs a circular transparent cover disk 26, having an inward turned peripheral flange 27 which slips over the outside of flange 21. A plurality of arcuately spaced friction pads 28 is formed on the inside of flange 27 engaging the exterior of flange 21. The dimensioning of the parts is such that when the cover 26 is applied to the position shown in FIG. 2, it remains in place against unintentional dislodgment or twisting. The cover 26 may be twisted relative to the disk 19 by manual movement against the friction of pads 28. A feature of the present invention is the fact that the scale markings 31 are painted, stenciled, silk screened or photographically reproduced on the outer or inner surface of the disk 26 so that the markings can be read in conjunction with the underlying pointer 18. A reverse bend 22 is formed in pointer 18 adjacent shaft 17 so that the pointer immediately underlies disk 26 to reduce parallax.

The zero marking 32 of the scale markings 31 should coincide with the position of the pointer 18 when there is no object on the pan 14, but spring scales tend to become inaccurate in this respect and accordingly it is necessary to reset the scale to zero from time to time, usually by means of a screw or some other device. In accordance with the present invention it is unnecessary to use such conventional devices, in that when the pointer 18 does not coincide with zero 32 it is merely necessary to twist the cover 26 relative to the disk 19 until the pointer and zero coincide. Furthermore, in some scales a tare setting is provided, as when the material being weighed is held in a container and it is desired to merely weigh the material rather than the container. For such purpose, a tare setting is incorporated in the scale, to set the pointer at zero and disregard the weight of the container. Tare setting is supplied in the present construction, in that a container may be placed on the pan 14 and the cover 26 turned until the pointer 18 coincides with the zero 32.

A common use for scales of this general type is in weighing mail to compute the required postage for various classes of mail. Postal rates change and since it is desirable to incorporate in the scale dial a plurality of different scale bands for different classes of postage, scales of this type rapidly become obsolete or various unsatisfactory means must be used to attach new postage rates bands to the scale dial or a conversion table must be used. The disk 26 of the present invention is readily removable and the cost of replacement thereof is relatively small. Hence, in accordance with the present invention annular bands 33 showing postage rates for various classes of mail may be directly applied to the cover 26 either on the inside surface or outside surface thereof in the same manner as weight markings 31 and the same pointer 18 used to indicate the required postage. When postal rates change, the cover 26 may be discarded and a new cover substituted. Further, to improve the versatility of the scale, a cover 26 showing postal rates may be used sometimes and a different cover used when the scale is used for a different purpose. Changes from English to metric weights may also readily be accomplished by changing covers.

Figure 4:
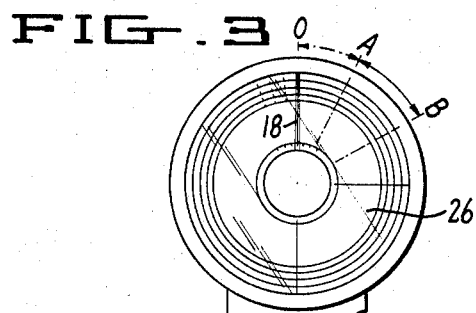
FIG. 4 is a fragmentary schematic view showing the use of the scale cover for zero setting.

The cover 26 is also useful in batch weighing. Let it be assumed that two ingredients are to be weighed and ultimately mixed in a batch. Referring to FIG. 4, the zero of the cover 26 is set at the zero indication of the pointer 18 when the pan 14 is empty. The first ingredient is poured onto the pan 14 until the pointer 18 reaches mark A which corresponds to the weight of the ingredient A to be added. Cover 26 is then twisted in a clockwise direction until the zero of the cover 26 coincides with the position of pointer 18. Ingredient B is then added to the pan 14 until the pointer 18 reaches the weight of the desired quantity of ingredient B, as indicated on the cover in its position. Additional ingredients may be added in the desired weights as required by repetition of the above procedure. Use of the scale for batching in this manner eliminates the need of adding to the weight of ingredient A the desired weight of ingredient B in order to compute the second scale reading. Such procedure is thus time saving and also reduced the opportunity for error.

It will further be seen that the pointer 18 is in close proximity to the cover disk 26 and to the markings thereon. When a scale is viewed at an angle by the user, and particularly where the pointer is remote from the dial marking, there is an opportunity for erroneous reading and the error changes as the pointer turns because if the position of the observer remains constant the angle between the pointer and the dial changes. Hence the present invention eliminates a chance for error due to parallax.

What is claimed is:

1. A scale construction comprising a scale casing, an apertured circular disk fixed to said casing having an outwardly turned peripheral first flange, a scale pointer, a shaft for said pointer extending from within said casing through said disk, a transparent cover having a diameter larger than said disk and having an inwardly turned peripheral second flange surrounding said first flange, said cover having a "zero" marking, and weight markings, said flanges being in frictional engagement with each other to permit rotation of said cover relative to said casing to adjust said "zero" marking and pointer relative to each other, said cover being freely manually adjustable relative to said disk, said pointer visible through said cover and registering with said weight markings.

2. A scale construction according to claim 1, which further comprises a plurality of angularly spaced friction pads on one of said flanges engaging the other of said flanges.

3. A scale construction according to claim 1, which further comprises postage rate indicia in addition to said weight markings.

References Cited

UNITED STATES PATENTS

| | | | |
|---|---|---|---|
| 1,537,158 | 5/1925 | Chatillon | 116—129 |
| 2,019,132 | 10/1935 | Hansen | 116—129 |
| 2,612,132 | 9/1952 | Triplett | 116—114 |
| 2,866,940 | 12/1958 | Lamb | 324—156 |
| 3,209,599 | 10/1965 | Harland et al. | 73—431 |
| 3,251,335 | 5/1966 | Dannevik | 116—117 |

FOREIGN PATENTS 502,974  12/1954  Italy.

LOUIS J. CAPOZI, *Primary Examiner.*